United States Patent [19]
Aeschlimann et al.

[11] 3,868,490
[45] Feb. 25, 1975

[54] METHOD AND DEVICE FOR FIXING A WATCH BALANCE SPRING TO A COLLET

[75] Inventors: Jean-Philippe Aeschlimann, Lausanne; Pierre Moniier, Neuveville; Jean Zaech, Bienne, all of Switzerland

[73] Assignees: Omega Louis Brandt & Frere S.A., Bienne; Alcyon Electronique et Physique S.A., Renens Canton of Biene, both of, Switzerland

[22] Filed: June 19, 1973

[21] Appl. No.: 371,413

[30] Foreign Application Priority Data
July 11, 1972 Switzerland......................... 10348/72

[52] U.S. Cl.......... 219/121 L, 58/115, 219/121 LM
[51] Int. Cl............................................. B23k 27/00
[58] Field of Search..... 219/121 L, 121 LM; 58/115

[56] References Cited
UNITED STATES PATENTS
3,071,365   1/1963   Henchoz........................... 58/115 X
3,673,376   6/1972   Kullmann...................... 219/121 LM

*Primary Examiner*—J. V. Truhe
*Assistant Examiner*—Clifford C. Shaw
*Attorney, Agent, or Firm*—Imirie, Smiley & Linn

[57] ABSTRACT

A method and device for fixing a watch-balance spring to its collet, comprising positioning a balance spring around a collet and pressing the coiled spring in radial direction against a part of the collet for uniformly engaging a part of the inner coil of the balance-spring against a surface of the collet, and, while radial pressure is still maintained, welding by laser the balance spring and collet together.

9 Claims, 5 Drawing Figures

METHOD AND DEVICE FOR FIXING A WATCH BALANCE SPRING TO A COLLET

BACKGROUND OF THE INVENTION

The invention concerns a method for fixing the balance spring of watches to the collet.

In prior methods the blade of the balance spring is brought into its definite position onto the collet, that is, into the position which the blade occupies after the fixing operation. This is done in a completely unstressed condition with regard to the collet; the collet, for the fixing by means of welding, bears, at least along a line parallel to the axis of the balance spring, snugly against the blade of the balance spring, however, without causing any deformation whatsoever of the spring blade.

In another prior method a portion of the balance spring blade is received in a notch of the collet, the fixing of the blade being then obtained by jamming by means of one or more rims of the collet.

A considerable inconvenience of the first-mentioned prior method resides in the use of positioning pins, which are very disadvantageous for adjustment during the mounting operation and the starting of the manufacture. Furthermore, the positioning of the balance spring and the collet with regard to their mutual level requires complicated utensils.

Prior devices have, for instance, pins projecting from a working table, the position of these pins with regard to the collet being chosen in such a way that the pins and the collet constitute guide means for the balance spring holding the latter without deformation in centered position.

The main disadvantage of these prior devices resides in the fact that the adjusting of the pins for the correct readjustment of the two surfaces to be welded together must be repeated.

In the second-mentioned prior method the closing or bending of the rim or rims includes the danger of a buckling of the balance spring in the direction of its width, resulting in a detrimental longitudinal torsion of the balance spring.

SUMMARY OF THE INVENTION

In order to remedy with the inconveniences of the prior art, The method according to the invention is characterised in that, at first, the balance spring is positioned on the collet and, thereafter, the coils of the balance spring are partly pressed in radial direction onto a part of the collet in order to obtain, for the welding operation by laser on at least one welding spot, a perfect bearing of a part of the end of a coil of the balance spring against a surface of the collet.

In this way, after the fixing operation by welding, the balance spring remains in perfect contact with the corresponding part of the collet. Furthermore, maintaining the balance spring on the collet by compression of the spring avoids any mounting and positioning problems before and after the welding process.

The invention also concerns a device for executing the method according to the invention. The device according to the invention for executing the method according to the invention is characterised by a pressure mechanism acting upon the outer coils of the balance spring in order to press the coils in radial direction onto a portion of the collet, and by a closing device for pressing the balance spring onto the positioning table in the correct position for the final fixing of the balance spring to the collet.

A further object of the invention is a collet for use in the method according to the invention. This collet is characterised by an elastical extension having at its one end two spirally shaped shoulders. This collet, after the welding operation, does not require any correction whatsoever.

DETAILED DESCRIPTION OF THE INVENTION

Figure 1:
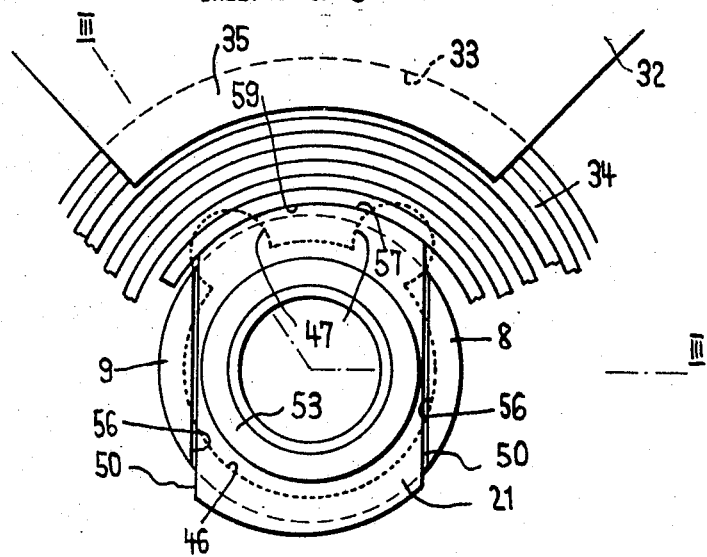
FIG. 1 is a plan view of a part of the balance spring, which, before the welding operation, is pressed against the collet.
Figure 3:
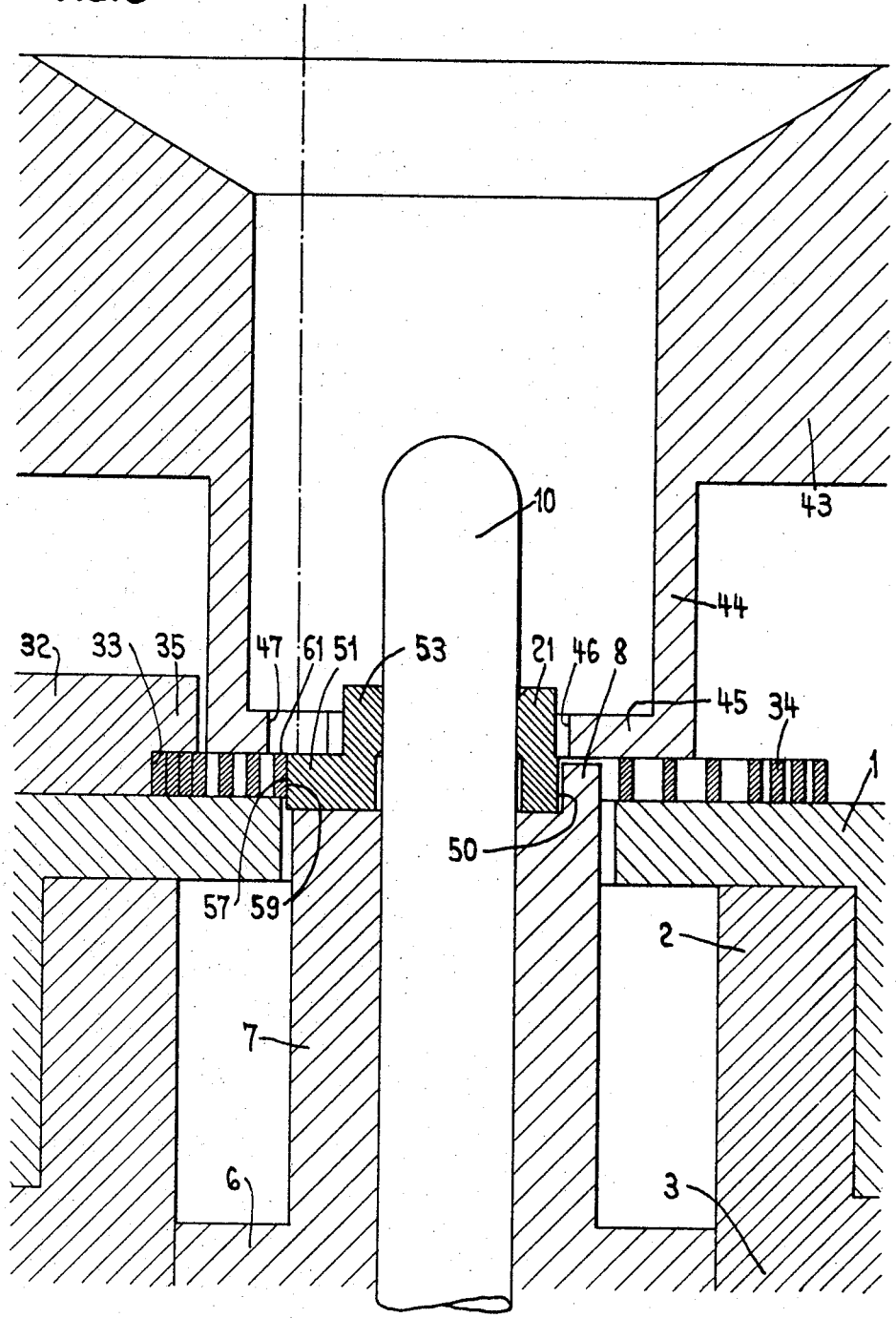
FIG. 3 is, on a larger scale than FIG. 1, a sectional view along the line III—III of FIG. 1 and illustrates the device for positioning the balance spring relatively to the collet.
Figure 5:
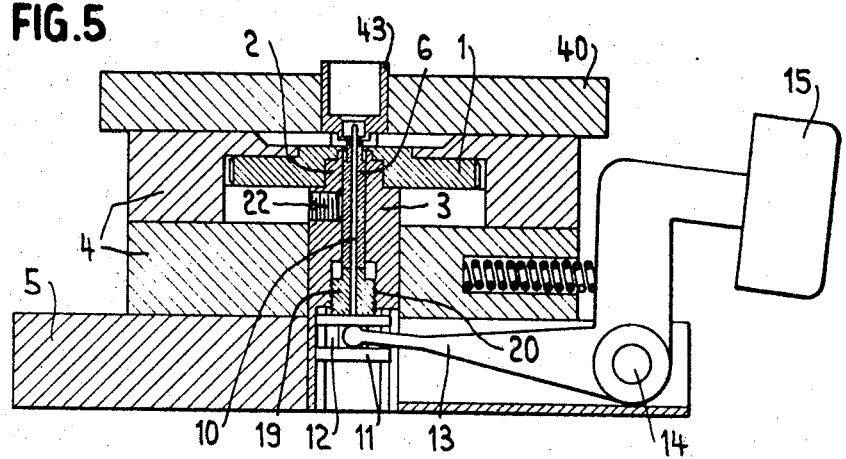
FIG. 5 is a schematic view of the mechanism for releasing the balance spring united with the collet from the device.

FIG. 3 and especially FIG. 5 illustrate a rotatable positioning table 1 mounted on a shoulder 2 of a column 3 traversing a lower intermediate member 4 and being mounted in a baseplate 5. The column 3 has an axial bore receiving an axle 6, the upper end of which has a shoulder 7 of cylindrical cross-section (FIG. 3). The free end of the shoulder 7 has a central recess leaving on the cross-section of the shoulder 7 only two rims 8 and 9 with inner facing surfaces 56 (FIGS. 1 and 3). The axle 6 has a central axial bore for the traversal of a pin 10 rounded at its upper end (FIG. 3), while the lower end of the pin 10 is mounted in a reciprocally movable block 11 having a groove 12. This groove 12 is engaged by the head-shaped end of a spring-loaded bent lever 13 swingingly mounted on a pin 14, while the other end of the lever 13 carries a handle 15 (FIG. 5). Between the reciprocating block 11 and the axle 6 an adjusting plug 19 is adjustably screwed into an interior thread 20 of the column 3. This plug 19 allows of adjusting the correct level of the collet 21 resting on the shoulder 7 of the axially adjustable axle 6 with regard to the positioning table (FIGS. 3 and 5). After adjustment of the axle 6 by means of the plug 19 the axle 6 is blocked by means of a set screw 22 (FIG. 5).

The pressing device (FIG. 4) has a rod 25 shiftable in an upper intermediate member 4 closed by a plate 26. The rod 25 has a groove 27 receiving a head 28 of a lever 29 swingingly mounted on a pin 31 and having a handle 30. The rod 25 and the lever 29 may be provided with an adjusting device not-shown. The one end 32 of the rod 25 is tapered and has a concave contact surface 33 (FIG. 2) whose radius is equal to that of the compressed balance spring 34 (FIG. 1). The end 32 has also a part 35 (FIGS. 1 and 3) bearing against lateral faces of the outer coils of the balance spring 34. A compression spring 100 acting onto the lever 29 and thereby onto the rod 25 presses the latter in the direction towards the balance spring 34 and may also be provided at another place.

The above-described centering mechanism comprises as main parts the pin 10 with the block 11 and the lever 13 or any other actuating means (FIG. 5).

Figure 4:
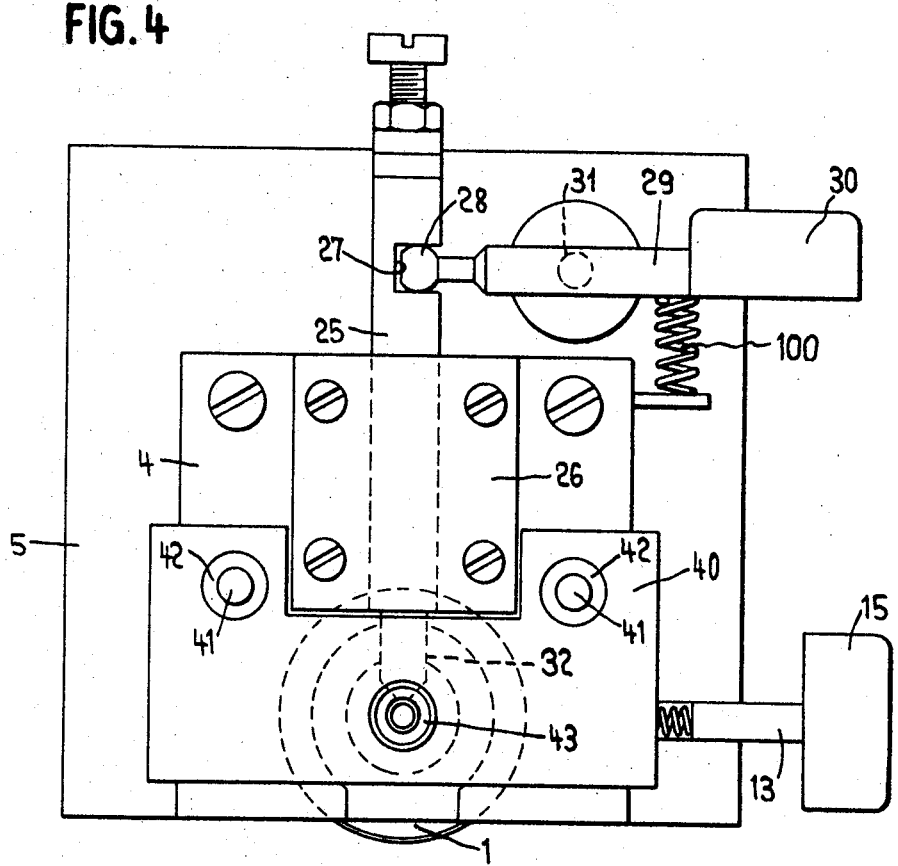
FIG. 4 is, on a smaller scale than FIG. 3, a plan view of the positioning and pressing device.

The device also comprises a closing plate 40 (FIG. 5) with rings 42 driven into it. The plate 40 is positioned by pins 41 entering the rings 42 (FIG. 4). Furthermore, a hollow centering member 43 mounted in the plate 40 has a portion 44 of smaller diameter than the remaining part of the member 43, this portion 44 comprising a seat 45 provided with an opening 46 (FIGS. 4 and 5 and especially FIG. 3); the seat 45 having two passages 47 (FIGS. 1 and 3) for the laser ray.

The collet 21 has two surfaces 50 parallel to each other (FIGS. 1 and 2) which end in two spirally shaped shoulders 51 and 52 lying opposite each other and being preferably obtained by punching. These spirally shaped shoulders serve as a starting base for the fixing of the balance spring 34. A non-slotted tubular extension 53 of the collet 21 has sufficient elasticity for fixing the collet 21 to the balance-staff.

The method according to the invention can be executed by means of the described and illustrated device in the following manner:

The first operation consists in seating the collet 21 in the central recess of the axle 6, laterally limited by the two rims 8 and 9 (FIGS. 1 and 3). In this respect it is to be noted that the surfaces 50 of the collet 21 are parallel to the surfaces 56 of the rims 8 and 9 of the recess of the axle 6 (FIG. 1). The exact positioning or centering of the collet 21 is obtained by the pin 10 removably fitted into the tubular extension 53 of the collet 21.

Figure 2:
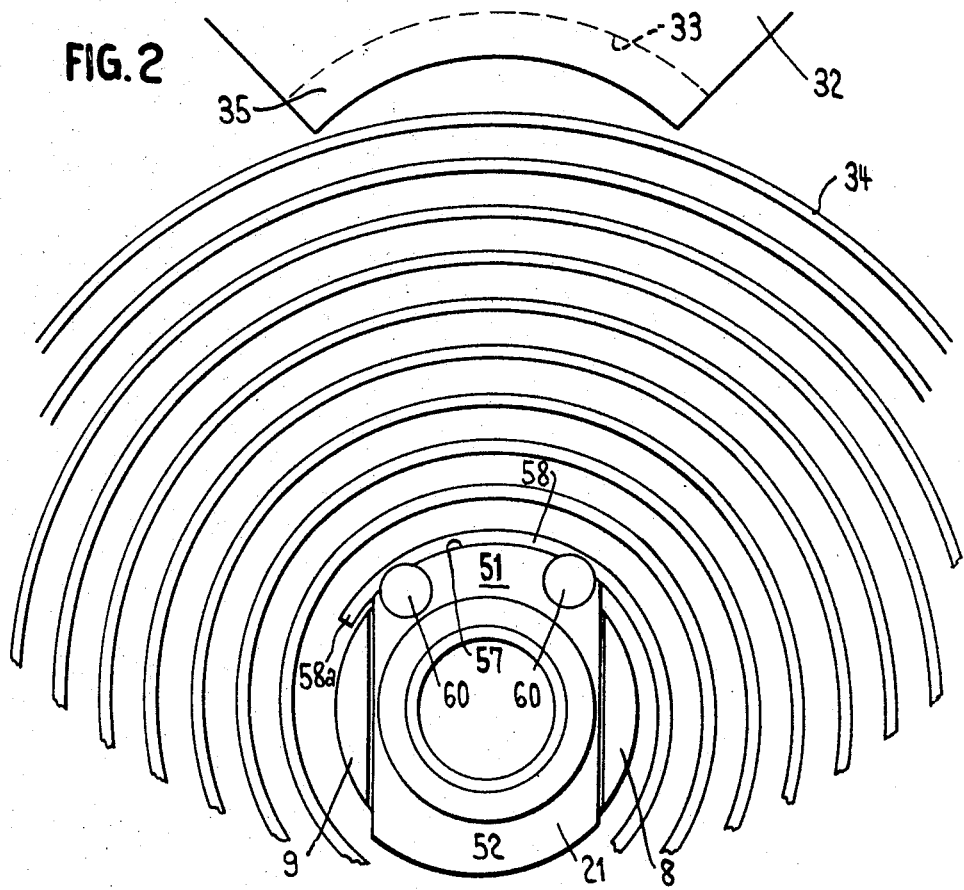
FIG. 2 shows, on a larger scale than FIG. 1, the balance spring, after it has been welded to the collet.

The second operation consists in withdrawing the rod 25 from the collet 21 with the aid of the handle 30 against the constraint of the spring 100 in order to position the balance spring 34 on the rotatable table 1. The balance spring 34 can be adjusted in circumferential direction on the surface of the shoulder 51 of the collet 21 in such a way that the free end 58a of the inner end portion 58 of the balance spring 34 projects freely from the collet 21 (FIG. 2). The adjustment is executed by means of the rotatable table 1. Afterwards the handle 30 is released so that the rod 25, under the constraint of the spring 100 presses the outer coils and coils lying more towards the inside onto one another with the exception of the innermost, for instance, the three innermost coils of the balance spring 34 (see left side in FIG. 3). This operation causes a perfect bearing of the inner surface 59 of the balance spring 34 against surface 57 of the shoulder 51 of the collet 21. It is important that the contact surface 33 of the rod 25, which is parallel to the surface 57 of the shoulder 51 of the collet 21, perfectly applies over the whole width of the outermost coil of the spiral spring 34 and exerts in this way a uniform constant pressure onto the whole width of the end portion 58 of the innermost coil, with the exception of the free end 58a, in order to guarantee a substantially uniform or perfect bearing of the coil over its whole width against the collet 21. During this operation, also the closing plate 40 is positioned on the pins 41 in order that the inner coils of the balance spring 34 are pressed onto the positioning table 1.

The third operation consists in switching-in the laser so that simultaneously at two spots 60 (FIG. 2) a radial welding on the shoulder 51 and on the side face 61 (FIG. 3) of the innermost coil of the balance spring 34 takes place.

The fourth operation consists in first pressing the handle 30, thereby removing the rod 25 from balance spring 34 and unstressing the compressed coils of the balance spring, then in withdrawing the pin 10 from the collet 21 by means of the handle 15, so that the assembled unit collet-balance spring can be removed in an easy manner from the device.

On the one hand in function of the intensity of light and on the other hand in function of the welding time, the materials with different melting points are welded together without any difficulty. Furthermore, the perfect close applying of the inner coil 58 of the balance spring to the collet 21 and the placing of the closing plate 40 allow a very exact positionning of the balance spring 34 on the collet 21. Moreover, the seat 45, due to its profiled opening 46 at 47 prevents a dispersion of the metal during its fusion for the welding.

Instead of two welding spots there may only be one or more than two welding spots.

There may also be provided one are more stations for the positioning and the welding.

We claim:

1. A method for fixing a watch-balance spring to its collet, comprising the steps of positioning the balance spring on the collet, partly pressing the coils of the balance spring in radial direction against a part of the collet for substantially uniformly engaging the area of a part of the end of a coil of the balance spring with a surface of the collet, welding by laser said part of the end of a coil to said collet with at least one welding spot, and releasing the balance spring from said radial pressure.

2. A method as claimed in claim 1, comprising positioning the balance spring on a positioning table concentrically around the collet.

3. A method as claimed in claim 1 comprising laser welding the spring and collet, simultaneously at two spots.

4. A method as claimed in claim 3, wherein said collet has a shoulder and said end part of said balance spring has a side face, and laser welding on said shoulder of the collet and on said side face of the balance spring.

5. A device for fixing a watch-balance spring to its collet, comprising a positioning table to receive the balance spring for positioning it, means to place the collet in position with regard to the balance spring, a pressure mechanism constructed and arranged to act onto the outer coils of the balance spring placed on said positioning table to press the coils of the balance spring in radial direction against a portion of the collet, closing means for pressing the balance spring onto said positioning table in position for the final fixing of the balance spring, and laser welding means for executing said final fixing.

6. A device as claimed in claim 5, said pressure mechanism comprising a shiftable rod having a spring engaging concave face to exert radial pressure against the coils of the balance spring.

7. A device as claimed in claim 5, wherein said closing means comprises a plate having a positioning part for bearing laterally against the inner coils of the balance spring.

8. A device as claimed in claim 5, including an axle to receive the collet, and a pin axially shiftable in said axle and positioning the collet in radial direction.

9. A device as claimed in claim 8, including surfaces on said axle for the orientation of the collet.

* * * * *

UNITED STATES PATENT OFFICE
CERTIFICATE OF CORRECTION

PATENT NO. : 3,868,490
DATED : February 25, 1975
INVENTOR(S) : Jean-Philippe Aeschlimann, et al It is certified that error appears in the above-identified patent and that said Letters Patent are hereby corrected as shown below:

Please amend as follows:

Inventors:

Pierre Monnier instead of Monier

Assignees:

Please delete "Canton of Biene"

Signed and Sealed this eleventh Day of November 1975

[SEAL]

Attest:

RUTH C. MASON
Attesting Officer

C. MARSHALL DANN
Commissioner of Patents and Trademarks